June 13, 1939. O. A. BANNER 2,162,543
POWER TRANSMISSION
Filed April 28, 1933 6 Sheets-Sheet 1
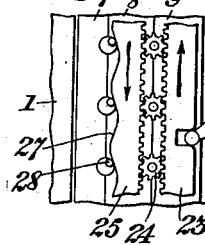
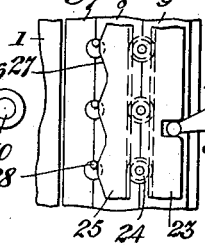
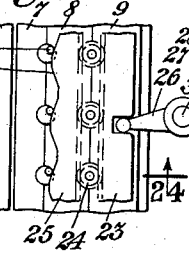
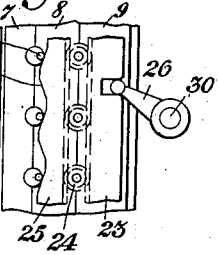
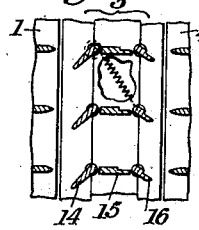
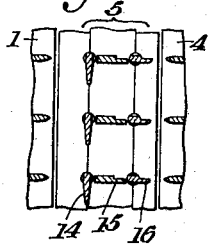
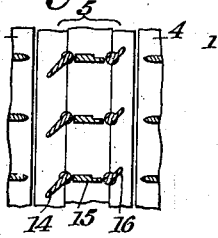
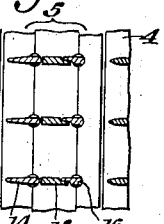
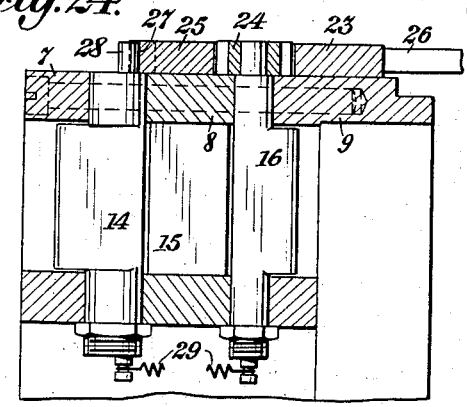
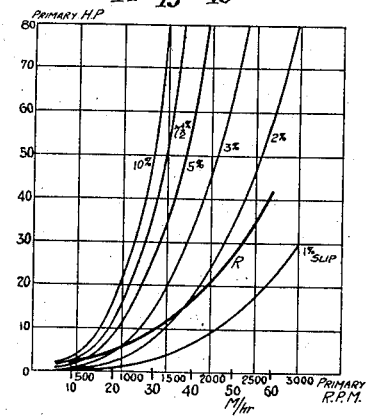
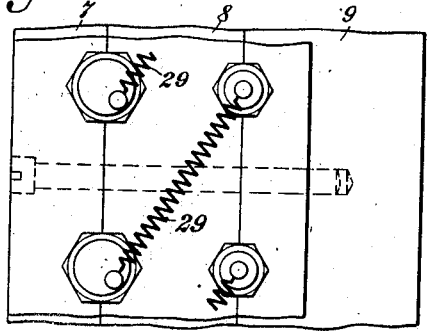
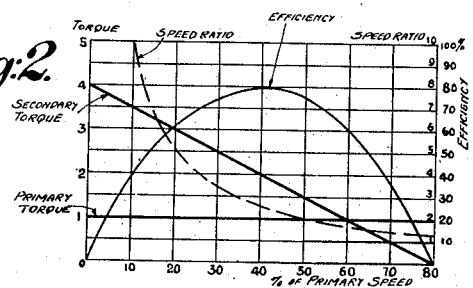
INVENTOR
Otto A. Banner
BY C. Campbell Heinicke
ATTORNEY June 13, 1939.  O. A. BANNER  2,162,543
POWER TRANSMISSION
Filed April 28, 1933  6 Sheets-Sheet 2

INVENTOR
Otto A. Banner
BY C. Campbell Henicke
ATTORNEY

June 13, 1939. O. A. BANNER 2,162,543
POWER TRANSMISSION
Filed April 28, 1933 6 Sheets-Sheet 3

INVENTOR
Otto A. Banner
BY C. Campbell Hinrichs
ATTORNEY

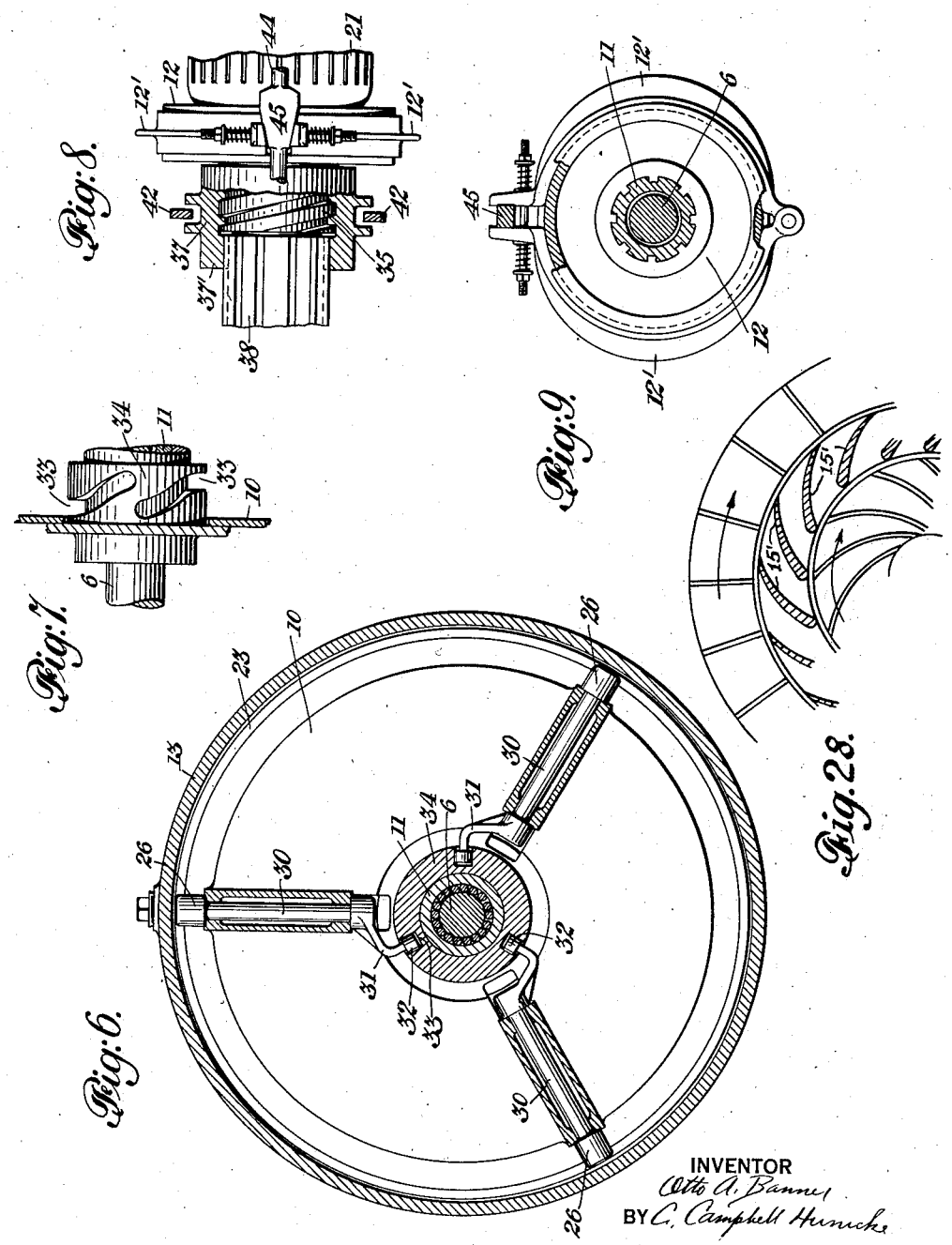

June 13, 1939.   O. A. BANNER   2,162,543
POWER TRANSMISSION
Filed April 28, 1933   6 Sheets-Sheet 5
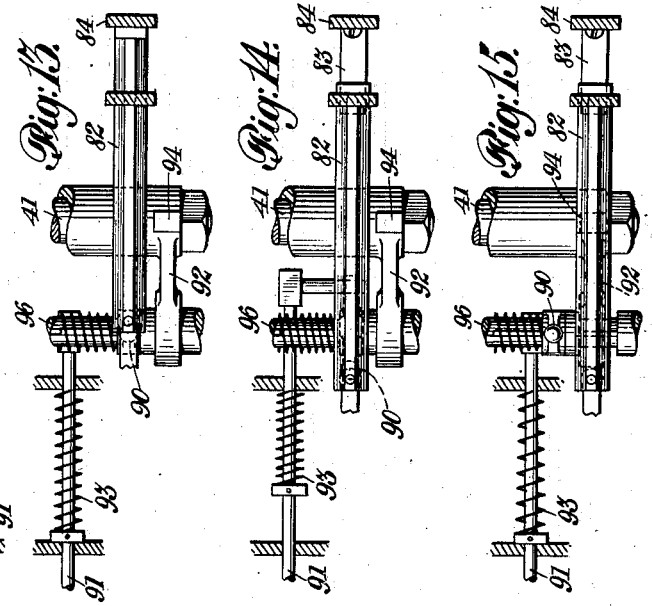
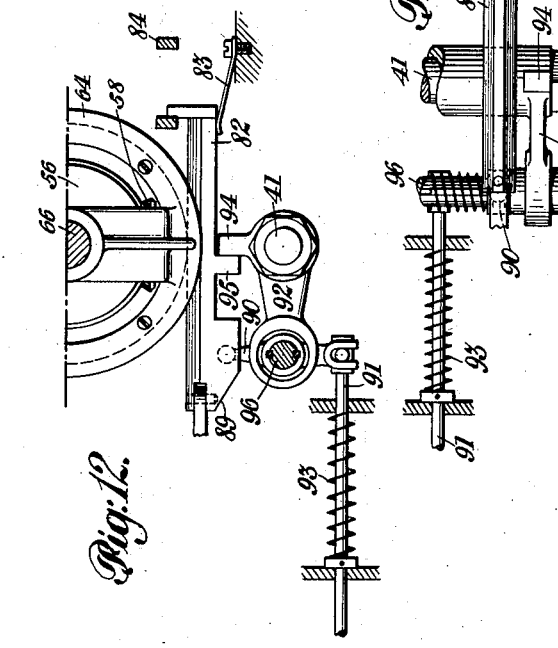
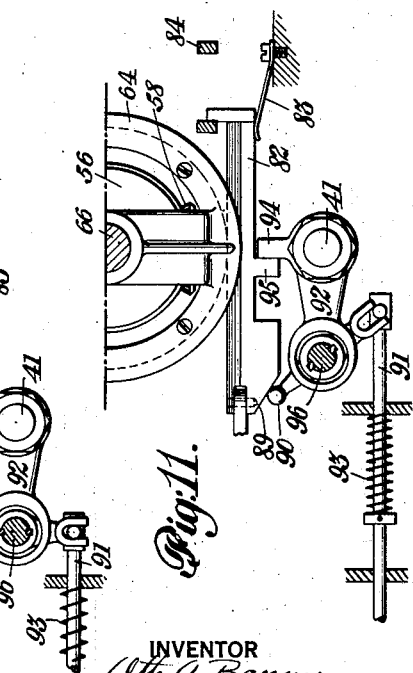
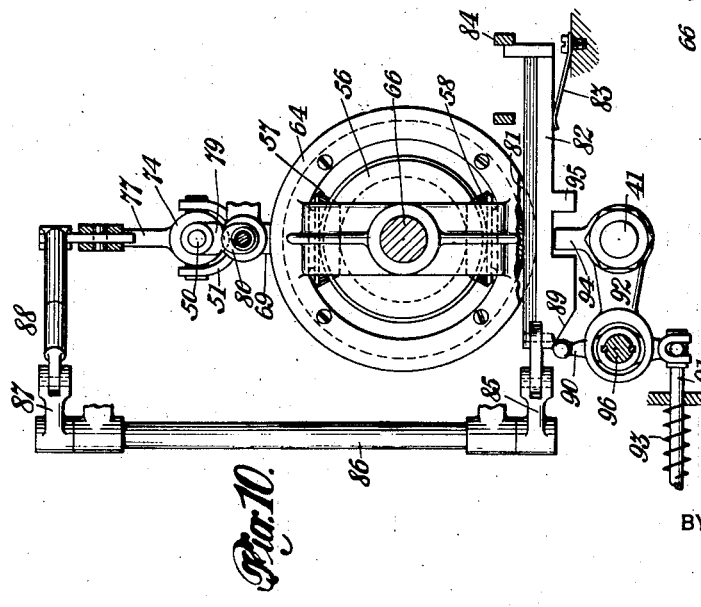
INVENTOR
Otto A. Banner
BY C. Campbell Hunnich
ATTORNEY

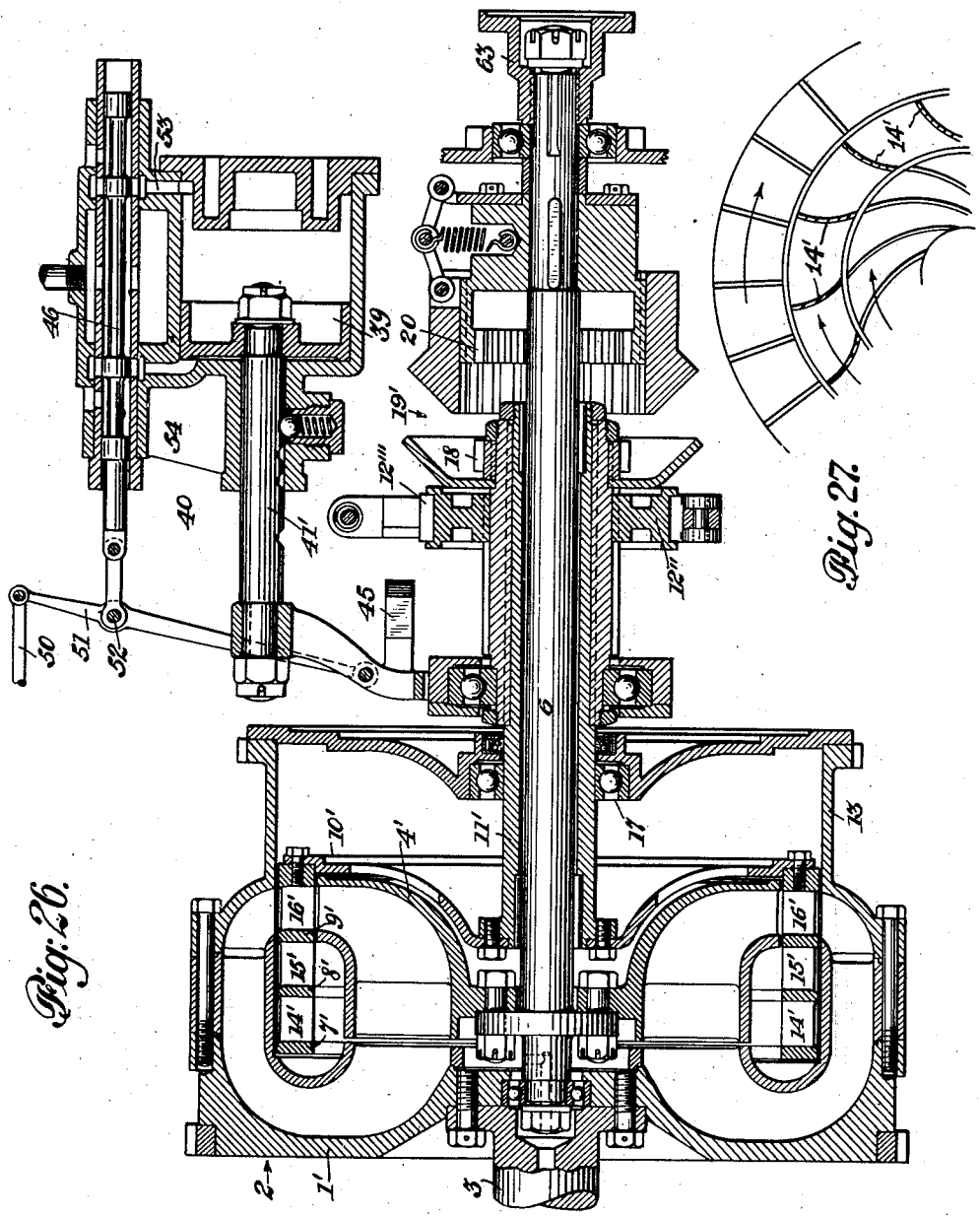

Patented June 13, 1939

2,162,543

UNITED STATES PATENT OFFICE 2,162,543

POWER TRANSMISSION

Otto A. Banner, Highland Park, N. J.

Application April 28, 1933, Serial No. 668,351

33 Claims. (Cl. 60—54)

This invention deals with turbo power transmission apparatus of the hydraulic flow type.

The power receiving part of such a transmitter consists of a centrifugal pump wheel and the power delivering part of a turbine wheel. In one adjustment of my apparatus, the working fluid is delivered directly into the vanes of the turbine wheel. This power transmission I call a turbo clutch. In another adjustment the working fluid passes first through a set of stationary guide vanes before entering the turbine wheel. This second power transmission I call a turbo transformer.

The turbo clutch can operate with efficiencies as high as 99%. This compares very favorably with the efficiency of an automobile transmission gearing. Because, even when such a drive is operating in "high" there are friction losses. This is apparent, when it is considered that two lay shafts are continually rotating in the gear box, with the gears revolving in the lubricant, whereby considerable friction losses are generated. Thus, it is apparent that a turbo clutch is a power transmitter equivalent to the gear transmission as far as efficiency is concerned. But, besides, it has considerable advantages over it.

However, for automobile propulsion and similar application, the turbo clutch has these disadvantages: First: It cannot increase the motor torque. Such an increase is imperative for the acceleration of the car when starting. Second: It cannot reverse the rotation of the secondary part.

However, if the turbo clutch is combined with a turbo transformer to form a combined turbo clutch and transformer, these disadvantages are completely removed. As stated before, the turbo transformer consists of: a pump wheel, a turbine wheel, and a set of stationary guide vanes interposed between the discharge of the pump and the intake of the turbine wheel. Since the guide vanes may be designed or adjusted as required, it is possible to obtain, with the turbine wheel, higher or lower speeds than, also reversal of, rotation of the pump wheel. Furthermore, the turbo transformer increases automatically the motor torque when the car is started. This makes it a superior transmission means over the gear drive. When starting from a standstill, the reduction ratio is theoretically infinitely large. With increasing speed it decreases continually, smoothly, and automatically to the desired rate of reduction. The turbo transformer therefore will accelerate a car more quickly than a gear driven car, and without gear shifting and also noiselessly. It is free from wear, and the shafts are not subject to bending loads.

One of the objects of my invention is to combine a turbo clutch with a turbo transformer, thereby forming a turbo transmission.

Another object is to provide a method and apparatus for the transmission of power hydraulically, whereby the motor torque may be increased on starting, and the efficiency may be high when in use.

A further object of the invention is to permit reversing of the hydraulic drive.

Still another object of the invention is to combine the turbo clutch and turbo transformer by arranging the guide vanes so that they are held stationary during the starting up operation, when the turbo power transmitter operates as a turbo transformer, and then, at the desired speed, to rotate and combine them, preferably, with the turbine wheel, when the turbo transmitter operates as a turbo clutch.

Other objects of this invention appear more fully hereinafter.

Referring to the drawings:

Figure 1 shows a chart of power curves.

Figure 2 shows the characteristics of my turbo transmission for a ratio of 1:2.5.

Figure 4 is a sectional view of Figure 3, along the line 4, 4, looking in the direction of the arrows.

Figure 5 is a sectional view of Figure 3 along the line 5, 5, looking in the direction of the arrows.

Figure 6 is a sectional view of Figure 3 along the line 6, 6, looking in the direction of the arrows.

Figure 7 is a detail view of vane ring actuating cam.

Figure 8 is a detail view partly in section along the line 8, 8, of Figure 3, looking in the direction of the arrows.

Figure 9 is a detail view of a part of the brake mechanism along line 9, 9, of Figure 3.

Figures 10, 11, 12, show end views of the comparator in three different operative positions.

Figures 13, 14, 15, are plan views of Figures 10, 11, 12.

Figures 16, 17, 18, 19, are different positions of the vane tip actuating mechanisms.

Figures 20, 21, 22, 23, show the positioning of the vane tips corresponding respectively to Figures 16, 17, 18, 19.

Figure 24 is a sectional view along the line 24, 24, of Figure 18, looking in the direction of the arrows.

Figure 25 is an inverted plan view of Figure 24.

Figure 26 is a similar sectional view to Figure 3 of a modified form.

Figures 27, 28 and 29 are detail sectional views showing the curvature of the guide vanes between the primary and secondary impellers of the construction shown in Figure 26 of the drawings.

Figure 3:
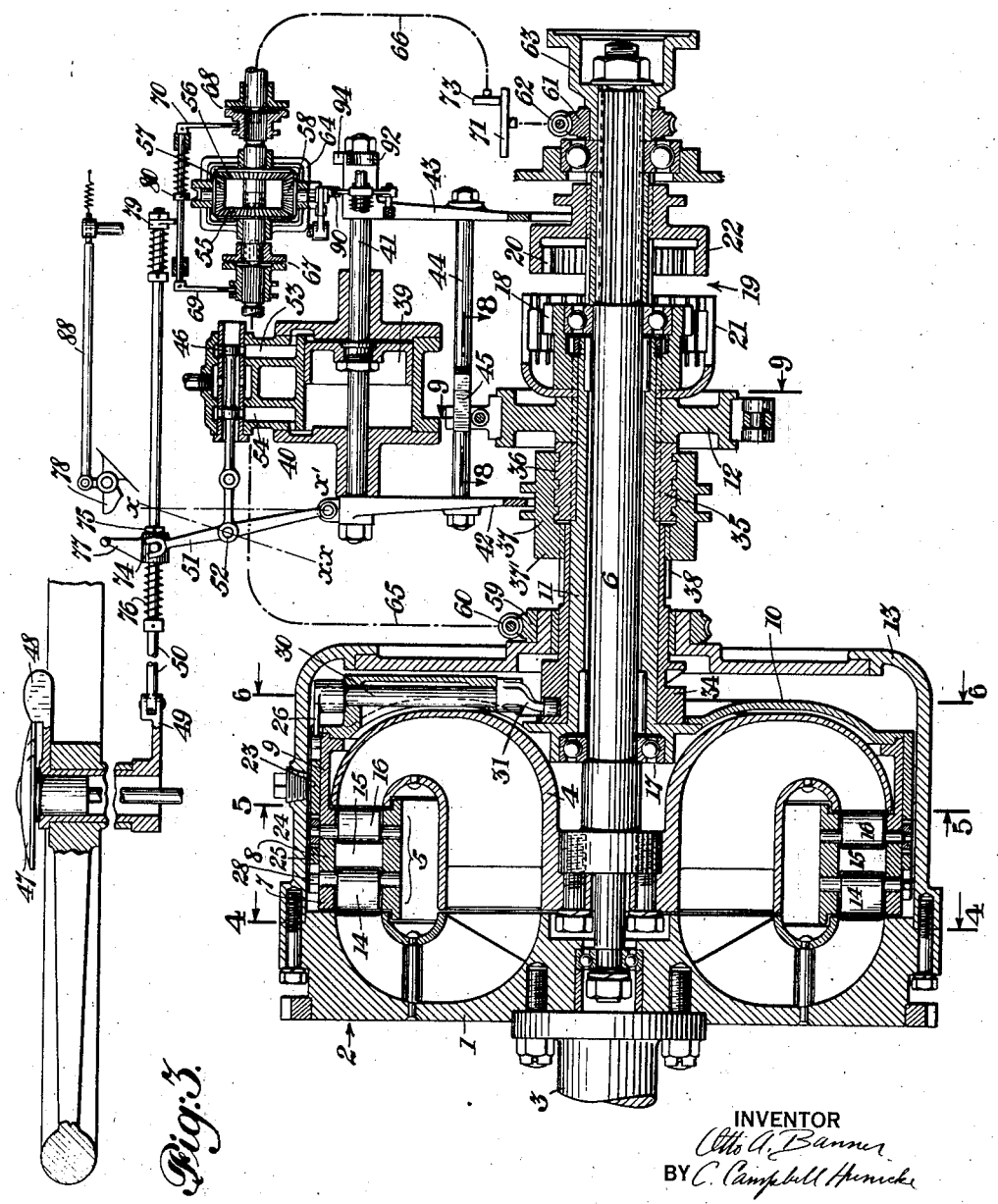
Figure 3 is a sectional view of a device embodying the principles of my invention.
Figures 4, 5, 29:
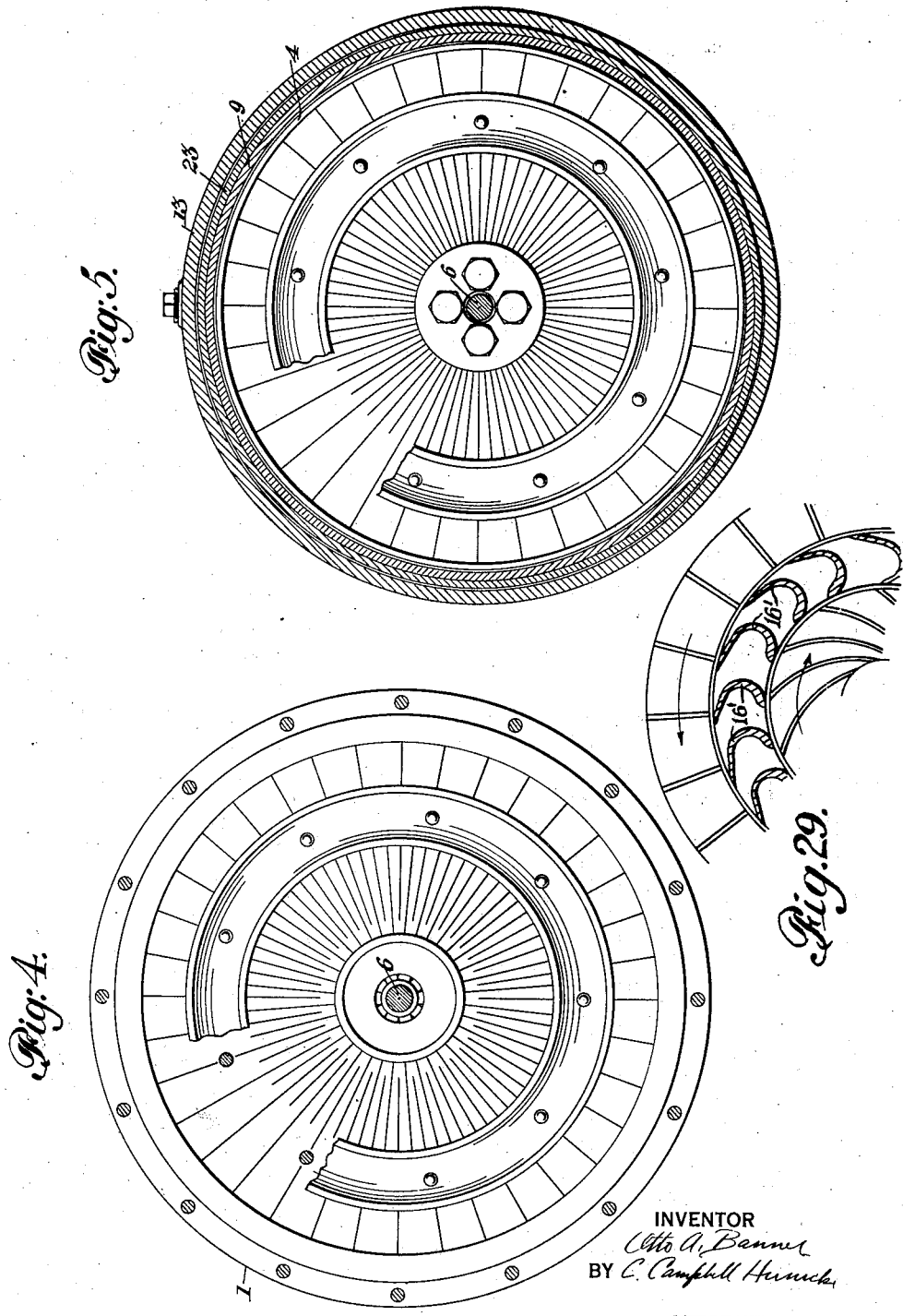

Referring to Figure 1, I have shown the relation between power, slip and speed of a turbo clutch. The abscissae represent the pump wheel, or motor shaft, speeds while the ordinates represent the power which can be transmitted by the turbo clutch. The curves represent the functioning of a rather small clutch of only 12⅞" diameter. The power delivered by the turbine wheel is always smaller by a percentage equal to the slip than the power delivered to the pump wheel. Curve R shows the resistance of an average American small car on a level road. The car speeds marked on the axis of the abscissae correspond to the motor speeds of a direct drive, geared car. Referring to the curves it will be noted that, even at ten miles per hour, the turbo clutch will supply an excess of the necessary power with a reasonable loss. But if the motor is speeded up, the car speed still being ten miles per hour, the slip can be reduced to the negligible amount of only 2%. Means for reducing the slip will be described subsequently.

The curves Figure 2, indicate the characteristics of a turbo transformer which has been designed for a normal speed reduction ratio of 1:2.5. The assumption has been made that the pump speed and power input are maintained constant. The abscissae show the turbine wheel speeds in percentages of this constant pump wheel (or motor) speed, which has been assumed as 100%. The ordinates on the left side are the torques measured as multiples of the constant motor torque, which has been assumed as unity. On the right side are two lines of abscissae: One, indicating the efficiency, the other, the ratios of turbine speeds to pump speed. The reduction ratio of 1:2.5 results in a turbine speed of about 40% of pump speed. For this value the efficiency is maximum and the turbine torque is twice the motor torque. Figure 2 shows clearly that the torque of the turbo transformer increases automatically the more the turbine speed is reduced. When the turbine wheel is standing still, which is the condition existing when the car is started from a standstill, the torque is four times the motor torque. This enables quick starting and quick acceleration even under most adverse conditions.

In carrying out my invention. I propose to provide a pump, or primary, wheel 1 which is shown as forming a part of fly-wheel 2 carried by motor shaft 3. The primary wheel 1 cooperates with a turbine or secondary wheel 4, so that the two inlets and the two outlets of the wheels are axially alined. The fluid discharged from the primary wheel 1 enters a set of guide vanes 5 which are made selectively stationary or rotating, and from these it is discharged into the inlet of the secondary wheel 4. During the passage through the vanes of wheel 4 the fluid delivers or transmits its energy and is then discharged, at the center, into the inlet of primary wheel 1. Thus a closed circuit is formed. At the same time, due to the rotation of the primary and secondary part, this circuit is rotating around the axis of shafts 3 and 6, which are in alinement. The secondary wheel 4 is operatively connected to the secondary shaft 6 which transmits the power to the ultimate use. The guide vanes 5 are attached by means of the rings 7, 8, 9, to the disk 10 which is operatively attached to the sleeve 11. On this sleeve is fixed, in any known manner, such as by splines, the brake drum 12. The fluid transmission members 1, 4, and guide vanes 5 are completely enclosed, for instance as shown, by fly-wheel 2 and cover 13. As long as the rotation of 12 is prevented, it is obvious that the disk 10, and with it the guide vanes 5, are held stationary. In this case the fluid issuing from primary wheel 1 enters the inlet parts 14 of the guide vanes with an angle and a velocity equal to those with which it leaves the primary wheel 1. The inlet parts 14 are adjustable. From these it passes into the axial body portions 15 of the guide vanes 5 and from there to the adjustable outlet parts 16 of the guide vanes 5, to be directed against the vanes of the secondary wheel 4. This combination of primary wheel 1, stationary guide vanes 15 and secondary wheel 4, is what I have called a turbo transformer.

The sleeve 11 is supported by ball bearings 17 on the secondary shaft 6. To the end of the sleeve is fixedly attached the male part 18 of coupler 19 which can be brought to mesh with its female part 20. This part is axially movable on, and splined for transmitting power to, the secondary shaft 6. When the brake drum 12 is released for rotation, the fluid flow, emitted from primary wheel 1, immediately accelerates the guide vanes 5, and together with them the disk 10, also the shaft 11, together with brake drum 12 and male coupler 18. As soon as the speed of these free rotating parts has reached that of the secondary parts 4 and 6, the coupler 19 can be moved into mesh. When this is done, the guide vanes 5 with their supporting parts are rigidly connected to rotate in unison, with the secondary wheel 4. The operation is then that of a turbo clutch, because there are no stationary members between primary and secondary parts, the guide being an integral part of the secondary wheel. In order to avoid clashing of the teeth of the two parts of the coupler 19, provision has been made to equalize the speed of the secondary wheel 4 and the guide vanes 5 by placing a pair of friction members in rubbing contact before the teeth engage. These friction members may be of the type known as a synchromesh clutch. They have been shown at 21 on the guide vane parts and 22 on the secondary shaft parts. The impeller vanes in the primary wheel 1 and the impelled vanes in the secondary wheel 4 have been assumed as being radial. For clutch operation it is desirable to have the vanes throughout the secondary parts radial. Arrangements have therefore been made to set the inlet and outlet parts 14 and 16 in a radial position when the transmitter is operating as a turbo clutch. When my transmission is operating as a transformer, the movable parts 14, 16, of the guide vanes must be adjusted differently: The intake parts 14 should be positioned at a sharp angle to receive the fluid discharged from primary wheel 1 with a minimum of losses. The outlet parts 16 may be adjusted in any desired way.

It is this adjustment which makes the present arrangement of great value. One may for instance set the guide vanes 5 so that they reverse the direction of the flow, thereby reversing the direction of rotation of the secondary wheel. Such reversal is not possible with the turbo clutch, as explained above. It makes the application of my invention especially valuable for use in motor vehicles, etc., because it permits dispensing with reverse gearing.

The outlet parts 16 may also be set in a transverse plane. In this position they discharge the liquid so that the secondary wheel does not transmit any power. This position would correspond to the idling position of a geared motor car.

A third adjustment of the outlet vanes 16 would be such as to discharge the fluid in the same direction but at a different angle than it is received by the inlet vanes 14. The secondary parts run then in the same direction as the primary wheel and, according to the angle of discharge, the speed reduction ratio between primary and secondary wheel may be varied. Therefore, by changing the positioning of the adjustable outlet elements 16, a wide range of speed variations may be obtained, as well as reversing and idling. I have thus shown that the application of my invention permits of completely doing away with the transmission gearing in motor cars. Yet, at the same time I obtain much larger starting torques, quicker acceleration, noiseless starting, shockless power transmission and higher efficiency. The positioning of the movable elements of the vanes is indicated in Figures 16, 17, 18, 19, 20, 21, 22, 23, 24 and 25. It should be noted that the guide vane assembly 14, 15, and 16 is maintained stationary in the Figures 16, 17, 18, 20, 21, 22, but that they are rotating as an integral part of the turbine wheel in Figures 19, 23. Therefore, the Figures 16, 17, 18, 20, 21, 22, demonstrate transformer and Figures 19 and 23 clutch operation. In Figures 16 and 20 the inlet vanes 14 are set at the correct angle to receive the fluid from the primary wheel 1 with minimum losses. The outlet vanes 16 are set so that they reverse the flow. This means that the secondary wheel 4 with attached parts is running in the opposite direction to primary wheel 1. Figures 17 and 21 show the vanes 14 in a radial plane and the outlet vanes 16 in axial planes. In this position no power is transmitted from primary to secondary parts. The engine is idling. Figures 18 and 22 show transformer operation for ahead drive with a definite, designed, speed reduction. Figures 19 and 23 show the vanes alined in radial planes. When in this position the guide vanes are made an operating part of the secondary wheel. This is the position for clutch operation.

Figures 16, 17, 18 and 19, show the mechanical movement of the guide vanes 5 to obtain the desired settings. A geared ring 23 is provided, which meshes with gears 24 fixed on the outlet vanes 16. Movement of this ring is effected by levers 26. The small gears 24 on 16 mesh with another gear ring 25 which on its other side is shaped as a continuous cam 27. Against its operating, or cam, surfaces 27 are set pin like projections 28 of the inlet vanes 14. These vanes are always under the pressure of the fluid emitted from 1. But, in order to positively prevent rattling, springs 29 have been provided which maintain contact between the adjustable elements 14 and the cam surface 27. When the levers 26 are moved through a predetermined angle, the gear ring 23 is moved in the direction of the arrow and the vane ends 16 move from reverse position through idling and ahead into clutch position. At the same time the gear cam ring 25 moves in the opposite direction, causing the movement of the inlet ends 14 to move in accordance with the cam surface 27.

Referring to Figures 3, 6 and 7, the lever 26 is fixed on a shaft 30 which, at the inner end, carries a lever 31. This lever is used to furnish the movement of the levers 26 through the control angle in the following way: It carries a cylindrical journal 32 which is inserted in a cam groove 33 of journal 34. This cam groove 33 is cut in a spiral, so that by turning journal 34, levers 31 must swing through an angle which is designed so as to obtain the desired movement of levers 26. Journal 34 is rotatably loose on sleeve 11 rotation of which, in turn, is prevented during transformer operation by tightening the brake shoes 12' on the brake drum 12. Adjustment of journal 34 is obtained in the following way: On sleeve 11 is splined a ring 35 which has exterior screw threads 36 on which a nut 37 has been screwed. This nut 37 carries an extension 37' which is loosely splined on journal 34. An axial movement of nut 37 will result in unscrewing and thereby turning of it. This turning movement is transmitted by means of the splines 38 to journal 34. Thus an axial movement of nut 37 results in the turning of levers 26 and the movement of the guide vane ends 14 and 16.

The movement of nut 37 is performed by a power piston 39 in the relay 40. The piston rod 41 of piston 39 carries a fork 42 having one end adapted to move nut 37. At its other end it carries another fork 43 adapted to move the female coupler half 20. In the position shown, the piston 39 has set the vanes for reverse operation and the brake drum 12 is held against rotation by the brake shoes 12'. When the piston moves to the left it consecutively sets the guide vanes for reverse, idling and slow ahead position. This last position is shown in Figures 18 and 22. The nut 37 has advanced equally with the piston, and has turned the vanes 14 and 16 from the original reverse through idling to slow ahead position.

The next step of operation would be the change from transformer to clutch operation. This will require the following detail steps: First: Setting guide vane ends 14 and 16 radial. Second: Release the brake 12. Third: Put coupler 19 in mesh.

The setting of the vanes 14 and 16 is obtained by moving the nut 37 into the end position, which results as soon as piston 39 is run into the extreme left position.

The releasing of the brake 12 is performed by the rod 44 which connects the forks 42 and 43. This rod carries a wedge 45. During the end motion of piston 39 this wedge 45 enters between the extensions of the brake shoes 12', forcing them apart and thus releasing brake drum 12.

The same motion of piston 39 brings about the movement of female coupler 20 to the left. First the synchromesh clutch parts 21 and 22 come into operating contact. This synchronizes the motion of secondary shaft 6 and sleeve 11. Further movement brings the coupler parts 18 and 20 into mesh. At the end of the movement of piston 39 the guide vanes 5 are made, to all intents and purposes, an operating part of secondary wheel 4 so that the vane parts 14, 15, 16, rings 7, 8, 9, disk 10, levers 26, shaft 30, lever 31, journal 34 and sleeve 11 moving as one unit. Thus clutch operation is established.

With my invention a very simple control is possible. I may, of course, use a hand controlled lever instead of a relay. But a great improvement over the present form of motor car operation can be established with my device: By the addition of very simple mechanical means a full automatic drive may be obtained. I will confine myself here to this latter operation, which preferably makes use of a power relay. This may be of any type and I have indicated a form in which a normally incompressible fluid, for instance lubricating oil, is used. The relay consists of the already named piston 39, the movement of which is controlled by the valve 46 in the following way: At a convenient place, preferably on the steering wheel, I have provided a sector 47 on which the different control positions: reverse, idle, slow ahead, full ahead, or others, are marked. The lever 48 may be set on any one of these or intermediate positions. In a conventional way, lever 48 operates a lever 49 from which its motion is transferred, by means of rod 50, to the lever 51. This lever is attached, at one end, to the piston rod 41, and, at the other, to the rod 50. At a point 52 intermediate these two, the control valve 46 is linked.

The operation of the relay is as follows: A movement of the rod 50 from the extreme left position towards the right, results in the movement of the lever 51 into the position X—X'. In this position the right hand oil inlet duct 53 is wide open for admission of pressure oil and the left hand inlet duct 54 is wide open for discharge of oil. The pressure of oil on the right piston side forces 39 to the left and this movement continues until the end of the lever 51 has reached the position X—XX. In this position both ducts are closed by the valve 46. Thus it has become clear that the setting of the control lever 48 on the steering wheel in any control position, positively results in a proportional setting of piston 39 and thereby of the guide vane ends 14 and 16 and the rest of the mechanism.

I have already previously mentioned that by means of comparatively simple devices, my drive may be made to function automatically. In the operation of an automobile having such an automatic drive the driver is relieved from shifting gears from standstill to full speed ahead operation. In a geared car, there are certain speed stages for ahead operation, which are primarily used to accelerate the car into its final, desired running speed. The necessity for such a speed reduction is due to the inability of the motor to develop torques appreciably above a certain average. These torques are not sufficient to furnish the much higher torques which are required to accelerate the mass of the car quickly and without stalling the motor. It is necessary to increase the torque by introducing gear reduction. The changing from one reduction to the other requires the use of a slip clutch. To make this changeover from one gear reduction to the other an automatic operation, requires complicated mechanical devices because of the difficulty to determine the time when it is propitious.

In my invention the conditions for establishing the changeover are much more favorable because I make use of the speed difference between the primary and secondary shafts, obviously not existing in a geared car because the speed ratio of primary and secondary shafts is fixed. The automatic drives, with my invention, involves the automatic changeover from ahead transformer to ahead clutch operation, the transformer operation paralleling the drive with speed reduction, and, the clutch operation, the direct drive of a geared car. In order to perform this changeover, I propose to use a mechanism which compares the speeds of the primary and secondary parts. I call such a mechanism a comparator. I have shown one such device in Figures 3, 10, 11, 12, 13, 14, 15. It consists of a planetary movement having two suns 55, 56, and two planets 57, 58. One of the suns 55 is driven from a convenient part of the primary drive. For instance, by the worm wheel 59 and worm 60 attached to the cover 13 of the transmitter. The secondary sun 56 is operated from a convenient part of the secondary shaft, for instance, by the worm 61 and worm wheel 62, shown fitted to the universal joint flange 63. The arrangement of the comparator is such that the two suns 55, 56, rotate in opposite directions. Meshing with both are the two planets 57, 58, and these are held in a cage 64 which is supported on the hubs of the suns. The connection between the two worm wheels 60 and 62 is made by means of shafts 65 and 66 and friction clutches 67 and 68, which, normally, are kept open. If it is desired to set the comparator for action, these clutches may be closed by means of the forks 69 and 70.

The action then is as follows: The primary sun 55 rotates at a certain speed. The secondary sun 56 rotates at a lower speed and in the opposite direction. This relative movement of the two suns results in the rotation of the planetary cage 64 in the direction of the primary sun 55. If now, by the action of the transformer, the speed of the secondary part increases, the speed of the planet cage 64 will decrease. At the moment when the speeds of the two suns are alike, the planet cage 64 will stand still. And if the speed of the secondary sun increases above that of the primary, the direction of rotation of the planet cage 64 will reverse. The idea of the comparator is, to make use of the reversing motion to operate controls which effect the change-over from the transformer to clutch operation, transformers may be designed to increase the speed of the secondary wheel over that of the primary wheel. We will not consider transmitters of this type here, but will confine ourselves to the more frequently used type of speed reducing transformers and especially to those adapted for automobile drive. It is not necessary to operate the comparator at the same speeds as the primary or secondary shafts. On the contrary, it will be desirable to operate it at lower speeds. This requires speed reductions between the primary shaft and primary sun and secondary shaft and secondary sun, and it is necessary to make these two reductions different and so that the primary and secondary suns are operating at the same speed, when the speed radio of primary and secondary shafts is the one at which changeover shall take place. I wish to point out that it is desirable to make this speed ratio variable so that the desired changeover may be obtained at different car speeds. For instance, when driving in city traffic, one may wish to drive at a maximum speed of ten miles per hour and it would not be desirable to have the car operate on the transformer continually. On the other hand, in order to make a quick get away, a changeover at forty miles an hour may be desirable. Such a variation may easily be obtained by interposing between worm wheel 62 and friction clutch 68, a friction disk 71 driven by worm wheel 62 and on which another friction disk 72 driving shaft 66 is pressed which may be moved radially inwardly or outwardly. The control of the second friction disk may be made by the lever 48 on the steering wheel and special notches provided for it.

As explained above, lever 48 controls the movement of rod 50. On this rod a block 74 is axially movable which is ordinarily pressed against a stop 75 by means of a spring 76. All the settings resulting in the positions reverse, idling, and slow ahead of the lever 51 and consequently piston 39 can be made without any interference, because the block 74 follows the movement of lever 48 exactly. But when the control is set for full ahead, which is equivalent to clutch operation, the movement of block 74 is stopped at the position for slow ahead, because extension 77 thereon meets the cam 78. Then the rod 50 slides in the block 74 into the position assigned to it by the setting of the lever 48. But, since the block 74 controls the position of lever 51, the piston 39 will set the drive only for slow ahead. Thus the setting of the control lever for clutch operation results: First, it sets the transmitter for slow ahead transformer operation; second, it sets the comparator ready for action. This second function is obtained by the rod 50, sliding in block 74, moving a dog 79 into contact with stop 80 which is shifted to the right and by this movement closing the clutches 67 and 68. With this setting the transmitter starts the car up, operating as a transformer. When the secondary speed has reached the predetermined point, the planet cage 64 comes first to a standstill and then slowly reverses.

As already previously stated, I have made use of this reversing movement in order to make the changeover to clutch operation. This I do as follows: Into the rim of the planet cage is cut a V-shaped groove 81 and in this groove is placed a bar 82. This bar is pressed into the groove by a spring 83. A stop 84 prevents the movement of bar 82 beyond a certain point during the time when the planet cage 64 rotates with the primary sun 55. But when the planet cage 64 reverses, it takes the bar 82 by friction, shifting it to the left. This movement is transferred by means of lever 85, shaft 86, lever 87, rod 88 to cam 78, turning it upwards. This movement permits the spring 76 to move extension 77 and block 74 to the left, whereby the floating lever 51 is set to permit the piston 39 to move into the end, or clutch, position. Thus the comparator has acted to automatically change the transmitter over from transformer to clutch operation. During the time of changeover, the power transmission is somewhat indefinite and it is desirable to cut the motor speed down in order to prevent racing. This has been effected in the following manner: On the bar 82 is provided a cam 89 and a lever 90 rests with its end against cam 89. When the comparator moves the bar 82 to the left, it turns the lever 90 to the left as shown in Figures 11 and 14. This movement is transmitted by means of rod 91, etc., to the carburetor control. Thus, in the first phase of these operations, the power of the motor is reduced, as desired. Coincident with this movement is the adjustment of the piston 39. When piston 39 reaches its end position, which is identical with clutch setting, an arm 92 on the piston rod moves the lever 90 to the left. This movement results in the end of lever 90 slipping off cam 89. The action of the spring 93 forces lever 90 back into the original position thus restoring the motor power. Thus, at the end of the piston stroke, not only has clutch operation been established, but also the motor power restored. Further, a dog 94 on the end of the piston rod 41 has slipped behind an abutment 95 preventing the slipping back of the bar 82. As explained in Figs. 3, 10, 15, the lever 90 is supported on the shaft 96 on which it can move lengthwise as well as turn. If desired, as soon as the changeover operation by the comparator has been concluded the piston 39 may open auxiliary clutches 67 and 68 in the shafting between drive shaft 65 and primary sun 55 and also between drive shaft 66 and secondary sun 56. If this is done, the comparator will operate only during the short time of changeover operations.

I have shown another form of my invention for obtaining selective clutch and transformer operation in Figure 26. The primary wheel 1' and secondary wheel 4' are here shown as not being interchangeable. Three rings 7', 8', 9', each having a set of fixed guide vanes 14', 15' and 16', are mounted on a disc 10', which, in turn, is fixedly connected with the sleeve 11'. The guide vanes 14' are for clutch operation and are, therefore, set radial. The vanes 15' are for slow ahead, the vanes 16' for reverse operation. All these vanes may be cast in one piece with the rings. Each set may be moved between the primary and the secondary wheel by the axial shifting of the sleeve 11'. During transformer operation, the brake drum 12" is held against rotation by the brake shoes 12''' which are conventionally held in the fixed structure of the car. During clutch operation, the brake shoes 12''' have released the brake drum 12" and the coupler 19' is in mesh, just as explained before. The piston rod 41' may be notched, with a ball detent to prevent accidental displacement of the setting if desired.

Other modifications of my invention may still be made and fall within the scope of my invention.

What I claim is:

1. In a hydraulic power transmission device a primary impeller, a secondary impeller, guide vanes interposed between the discharge of said primary impeller and the intake of said secondary impeller, said guide vanes having adjustable entrance and discharge elements, means for maintaining said guide vanes stationary and means for releasing them for rotation.

2. In a hydraulic power transmission device, a casing, a primary wheel and a secondary wheel within said casing, an axially shiftable multiple guide vane ring interposed between said wheels, means for selectively maintaining said guide vane ring stationary, and means for releasing said guide vane ring for rotation.

3. In a hydraulic power transmission device a primary wheel, a secondary wheel, a primary shaft for said primary wheel, a secondary shaft for said secondary wheel, selectively stationary and rotatable multiple guide vane rings interposed between said primary and secondary wheels, and means controlled by the speed difference of the primary and the secondary shafts to shift the operation of said guide vane rings from stationary to rotatable movement.

4. In a hydraulic power transmission device, a primary impeller, a secondary impeller, selectively stationary and rotatable guide vanes having adjustable entrance and discharge elements interposed between the discharge of the primary and the intake of the secondary impellers, a carrier for said guide vanes, and means for selectively adjusting said guide vane elements.

5. In a hydraulic power transmission device, a primary impeller, a secondary impeller, guide vanes having adjustable entrance and discharge elements interposed between the discharge of the primary and the intake of the secondary impeller, a carrier for said guide vanes, means for selectively adjusting said guide vane elements, means for maintaining said carrier stationary, means for releasing said carrier for rotation, and means for connecting it to rotate with said secondary impeller.

6. In a hydraulic power transmission device, a primary impeller, a secondary impeller, a shiftable multiple guide vane ring interposed between the discharge of the primary impeller and the intake of the secondary impeller, means for shifting said guide vane ring, said guide vane ring comprising in axial alinement inclined vanes for forward and reverse transformer operation and axial vanes for clutch operation, and means for maintaining the guide vane rings stationary during transformer operation and releasing said guide vane ring for rotation during clutch operation.

7. In a hydraulic power transmission device, a primary wheel, a secondary wheel, guide vanes having adjustable entrance and discharge elements interposed between said wheels, means for adjusting said entrance and discharge elements for forward operation, reverse operation and idling operation, means for selectively maintaining said guide vanes stationary, and means for selectively rotating said guide vanes with the secondary wheel during operation.

8. In a hydraulic power transmission device, a primary wheel, a secondary wheel, guide vanes having adjustable entrance and discharge elements interposed between said wheels, means for adjusting said entrance and discharge elements for forward operation, reverse operation and idling operation, means for selectively maintaining said guide vanes stationary, means for selectively connecting said guide vanes with the secondary wheel during operation, said means controlled by the speed difference of the primary and secondary wheel.

9. In a rotatable closed fluid circuit for power transmission, a primary impeller, a secondary impeller, means for changing the speed ratio of the two impellers, a speed comparator operated by said primary and secondary impellers, automatic means controlled by said speed comparator whereby said speed changing means may be connected with one of said impellers, a manually set indicating lever, said automatic means operative only when set for automatic operation by said manually set indicating lever.

10. In a rotatable closed fluid circuit for power transmission, a primary impeller, a secondary impeller, guide vanes between the discharge of said primary impeller and the intake of said secondary impeller, parts of said vanes movable and adjustable for reversing the direction of rotation of the secondary impeller, an auxiliary fluid circuit, and a relay operated by said auxiliary fluid for adjusting the angle of the movable parts of said vanes.

11. In a hydraulic power transmission device, a closed fluid circuit having primary and secondary impellers, guide vanes having adjustable entrance and discharge elements interposed between the discharge of the primary and the intake of the secondary impeller, means for selectively adjusting said guide vane elements, means for maintaining said guide vanes stationary, means for releasing said guide vanes for rotation, and means for connecting said guide vanes to rotate with one of said impellers.

12. In a hydraulic power transmission device a closed fluid circuit having primary and secondary impellers, means for increasing the torque on starting, means for increasing the efficiency and reducing the torque transmitted after starting, an auxiliary fluid circuit operating a relay, said means alternatively operative through said fluid circuit and said relay, and automatic means manually set for controlling the operation of said relay to operate only at a predetermined speed ratio of said impellers.

13. In a hydraulic power transmission device, a primary impeller of the turbine type, a secondary impeller of the turbine type, said impellers being in juxtaposition, an adjustable selectively stationary and rotatable vane system between the discharge of said primary impeller and the intake of said secondary impeller, means to control the vane system to cause the transmission to operate as a forward and reverse transformer, and as a forward turbo clutch.

14. In a hydraulic power transmission for operation as a turbo transformer and as a turbo clutch, a primary impeller, a secondary impeller, a shiftable multiple vane ring between the discharge of the primary impeller and the intake of the secondary impeller, means for shifting the vane ring, said multiple vane ring comprising in axial alinement a ring having inclined vanes for transformer operation and a ring having substantially axial vanes for clutch operation, and means for maintaining said vane ring stationary during transformer operation and connecting said vane ring with one of the impellers during clutch operation.

15. In a rotatable closed fluid circuit, a primary impeller, a secondary impeller, adjustable guide vanes between the discharge of the primary impeller and the intake of the secondary impeller, said guide vanes selectively stationary and rotatable, means for adjusting said guide vanes in planes containing the axis of one of the impellers.

16. In a hydraulic power transmission, a primary impeller, a secondary impeller, selectively stationary and rotatable adjustable guide vanes between the two impellers, a speed comparator operated by said primary and secondary impellers, means controlled by said comparator to change the speed ratio of the hydraulic transmission by adjusting said guide vanes.

17. In a hydraulic power transmission, a primary impeller, and a secondary impeller in juxtaposition, a speed comparator operated by said impellers, adjustable vanes between the discharge of the primary impeller and the intake of the secondary impeller, means controlled by the speed comparator to change the speed ratio of the impellers by adjusting said vanes, and means controlled by said comparator to change the motor load during said speed ratio change.

18. In a hydraulic power transmission, a primary impeller, a secondary impeller, selectively adjustable stationary and rotatable vanes between the discharge of the primary impeller and the intake of the secondary impeller, a speed comparator operated by said impellers, means controlled by said comparator to change the transmission speed ratio of said impellers by adjusting said vanes when a predetermined speed ratio between said primary and secondary impellers has been reached.

19. In a hydraulic power transmission, a primary impeller, a secondary impeller in a closed fluid circuit, selectively adjustable vanes between the discharge of the primary impeller and the intake of the secondary impeller, an adjustable speed comparator, means controlled by said comparator to adjust said vanes, said comparator operated by said primary and secondary impellers.

20. In a hydraulic power transmission, a closed fluid circuit, a primary impeller, a secondary impeller, selectively stationary and rotatable guide vanes between said primary and secondary impellers, a speed comparator operated by said primary and secondary impellers, means controlled by said speed comparator to selectively hold said guide vanes stationary and selectively release them for rotation, and means to connect said guide vanes to one of the said impellers when rotating.

21. In a hydraulic power transmission, a primary impeller, a secondary impeller, adjustable vanes between the primary and secondary impellers, a speed comparator, said comparator consisting of a primary sun wheel operated by said primary impeller, a secondary sun wheel operated by said secondary impeller, a planet wheel meshing with both sun wheels, and means controlled by said planet wheel to control the operation of said hydraulic power transmission by adjusting said adjustable vanes.

22. In a hydraulic power transmission device, a primary impeller, a secondary impeller, a shiftable selectively stationary and rotatable multiple guide vane ring interposed between the discharge of the primary impeller and the intake of the secondary impeller, means for shifting said guide vane ring, said guide vane ring comprising in axial alinement vanes for transformer operation and vanes for clutch operation.

23. In a hydraulic power transmission device, a primary impeller, a secondary impeller, guide vanes having adjustable entrance and discharge elements interposed between said impellers, means for adjusting said entrance and discharge elements for transformer and for clutch operation, means for selectively maintaining said guide vanes stationary and releasing them for rotation.

24. In a hydraulic power transmission, the combination of a primary vaned impeller, of a secondary vaned impeller, a rotatable vane system between the discharge of the primary impeller and the intake of the secondary impeller for determining the course of fluid therebetween, and means selectively effective to hold said vane system against rotation and to effect rotation thereof in unison with one of said impellers to thereby cause the transmission to operate alternatively as a transformer and as a clutch, said secondary impeller having a series of vanes arranged to receive the discharge from said vane system during both conditions of operation said vane system having vanes adjustable for directing the flow for transformer operation or for clutch operation.

25. In a hydraulic power transmission the combination of a primary vaned impeller, a secondary vaned impeller, a rotatable vane system between the discharge of the primary impeller and the intake of the secondary impeller for determining the course of fluid flow therebetween, and means selectively effective to hold said vane system against rotation and to effect rotation thereof to thereby cause the transmission to operate alternatively as a transformer and as a clutch, said secondary impeller having a series of vanes arranged to receive the discharge from said vane system during both conditions of operation said vane system being adjustable for directing the flow for transformer operation or for clutch operation.

26. In a hydraulic power transmission the combination of a primary vaned impeller, a secondary vaned impeller, and a selectively stationary and rotatable vane system between said impellers for determining the course of fluid flow therebetween, said system comprising a plurality of sets of vanes of different contour, and means for adjusting said system to selectively position either of said sets within the course of fluid flow between said impellers.

27. In a hydraulic power transmission, a primary vaned impeller, a secondary vaned impeller, selectively adjustable alternatively stationary and rotatable vanes between the discharge of the primary and the intake of the secondary impeller, said vanes being adjustable to produce a unit torque ratio and higher than unit torque ratios of the transmission.

28. In a hydraulic power transmission, a primary and a secondary impeller, a selectively stationary and rotatable multiple vane ring between the discharge of the primary and the intake of the secondary impeller, said multiple vane ring having in axial alinement vanes for producing a unit torque ratio and higher than unit torque ratios of the transmission.

29. In a hydraulic power transmission a primary vaned impeller, a secondary vaned impeller, adjustable, stationary and rotatable vanes between the primary and the secondary impeller, a speed comparator having primary and secondary members and a third member jointly driven by the primary and secondary members, and means controlled by the third member to adjust said vanes.

30. A fluid power transmitter comprising a circuit for fluid, rotary driving means energizing a fluid, rotary driven means receiving energy from said fluid, guide vanes operable to modify the angular movement of the fluid, and automatically operable means to shift said guide vanes out of or into said circuit in accordance with the speed of said rotary means, said rotary driving and driven means forming part of said power transmitting circuit.

31. A fluid power transmitter operating selectively as a transformer or a clutch comprising a circuit for fluid, a driving element, a driven element, a primary member fixed to the driving element, a secondary member carried by the driven element, guide vanes to direct the fluid, and means to automatically shift said guide vanes axially out of said fluid circuit at various speeds of the secondary member, the maximum shifting speeds being below the maximum high speeds of the secondary member.

32. In a hydraulic transmission, primary and secondary impellers, shiftable stationary or rotatable vanes between the primary and secondary impellers, a speed comparator comprising means driven by the primary impeller and means driven by the secondary impeller, and means controlled by said comparator to hold the vanes stationary and release them for rotation.

33. In a hydraulic transmission, a primary impeller, a secondary impeller, guide vanes between the primary and secondary impellers, a speed comparator comprising means driven by the primary impeller and means driven by the secondary impeller, and means controlled by said comparator to hold said guide vanes stationary or connect them with one of said impellers for rotation therewith.

OTTO A. BANNER.